(12) United States Patent
Lebens

(10) Patent No.: US 6,760,993 B2
(45) Date of Patent: Jul. 13, 2004

(54) RECOIL DEVICE FOR USE WITH A DECOY

(76) Inventor: Tyler John Lebens, 7315 Coldwater Rd., Fairview, TN (US) 37062

( * ) Notice: Subject to any disclaimer, the term of this patent is extended or adjusted under 35 U.S.C. 154(b) by 0 days.

(21) Appl. No.: 10/097,053

(22) Filed: Mar. 13, 2002

(65) Prior Publication Data

US 2003/0173445 A1 Sep. 18, 2003

(51) Int. Cl.$^7$ .......................... A01M 31/06; B65H 75/48
(52) U.S. Cl. ........................... 43/3; 242/379; 242/381.3
(58) Field of Search .............................. 242/379, 385.4, 242/397, 400, 402, 381.3; 43/3

(56) References Cited

U.S. PATENT DOCUMENTS

| | | | | |
|---|---|---|---|---|
| 390,587 A | * | 10/1888 | Gammon | 43/3 |
| 1,429,558 A | * | 9/1922 | Bauer | 43/3 |
| 1,444,342 A | * | 2/1923 | Godward | 43/3 |
| 1,486,329 A | * | 3/1924 | George | 43/3 |
| 1,967,902 A | * | 7/1934 | Reichel | 242/375.3 |
| 2,539,727 A | * | 1/1951 | Clark | 43/3 |
| 2,608,361 A | * | 8/1952 | Huebner | 242/385 |
| 2,747,814 A | * | 5/1956 | Taylor | 242/379.2 |
| 2,860,842 A | * | 11/1958 | Ryan | 242/375.3 |
| 3,733,733 A | * | 5/1973 | Ruter | 43/3 |
| 4,340,192 A | * | 7/1982 | Burris, III | 242/377 |
| 4,757,630 A | * | 7/1988 | Torberg | 43/3 |
| 4,826,099 A | * | 5/1989 | Johnson | 242/375 |
| 4,827,653 A | * | 5/1989 | Sewell | 43/3 |
| D348,716 S | * | 7/1994 | Sbrocchi | D22/125 |
| 5,367,813 A | * | 11/1994 | Cherry | 43/2 |
| D394,895 S | * | 6/1998 | Moody | D22/125 |
| 5,893,230 A | * | 4/1999 | Koltoniak | 43/3 |
| 5,941,008 A | * | 8/1999 | Schmidt et al. | 43/2 |
| 5,974,720 A | * | 11/1999 | Bowling | 43/3 |
| 6,487,811 B2 | * | 12/2002 | Barrett | 43/3 |

* cited by examiner

Primary Examiner—John M. Jillions
(74) Attorney, Agent, or Firm—IPLM Group, P.A.

(57) ABSTRACT

A recoil device (100) having a mounting member (101), a recoiling member (108), and a stopping member (117) is mounted onto an attachment surface (131) of an existing decoy (130) without compromising the structural integrity of the decoy (130). An anchor line (126) is operatively connected to the recoiling member (108) proximate the center (132) of the decoy (130) and is locked in place by the stopping member (117) proximate the front (133) of the decoy (130). The line (126) is locked in place when the stopping member (117) is in a first position, and the line (126) may be either drawn from the recoiling member (108) or automatically retracted by the recoiling member (108) when the stopping member (117) is in a second position (121b).

15 Claims, 2 Drawing Sheets

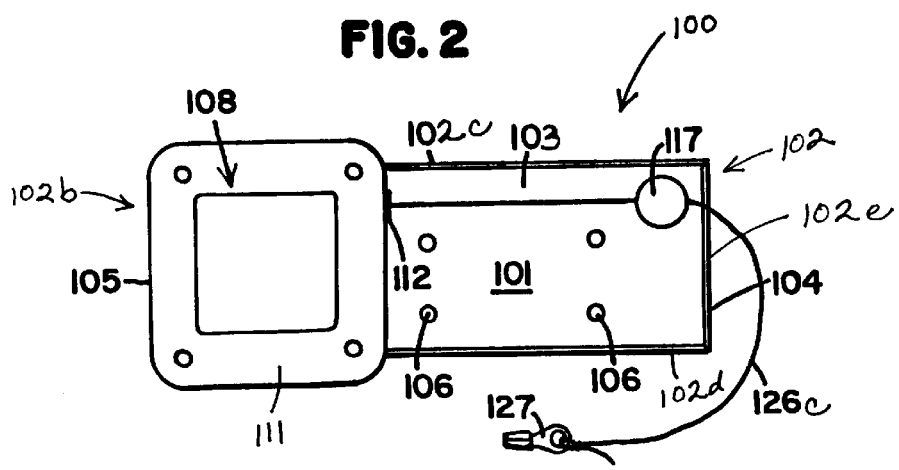
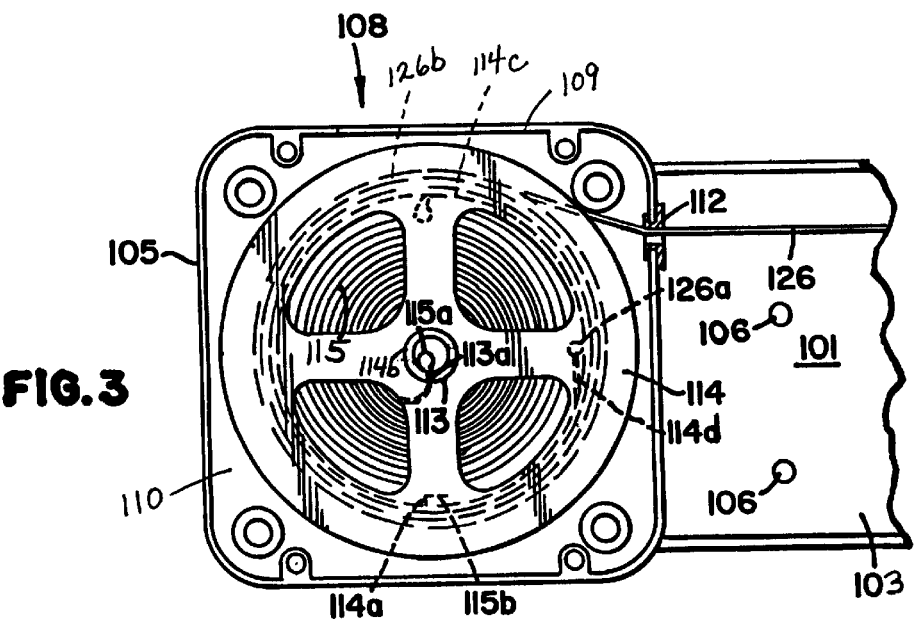
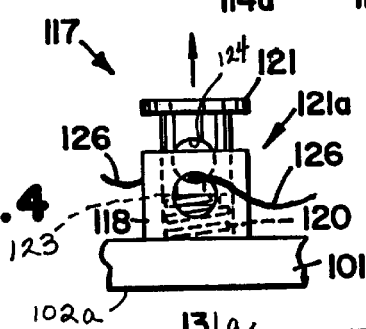
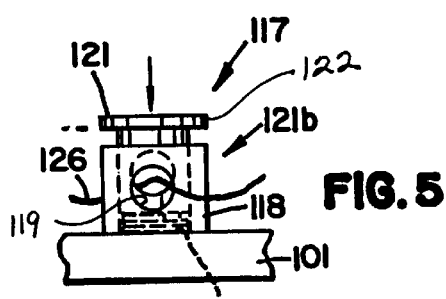
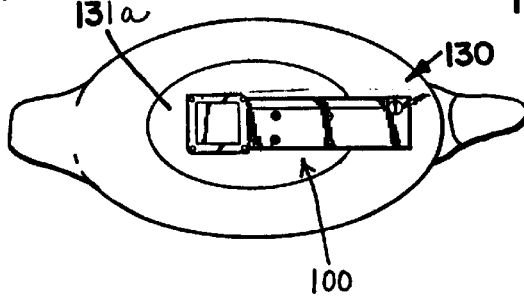

RECOIL DEVICE FOR USE WITH A DECOY

BACKGROUND OF THE INVENTION

1. Field of the Invention

The present invention relates to a recoil device for use with a decoy.

2. Description of the Prior Art

Decoys are often used by hunters of water fowl to attract or lure the water fowl within shooting range, and anchoring means are often provided on the decoys to anchor them in place in the water. Decoys are commonly anchored by tying a string to them and providing a small weight at the end of the string. Numerous decoys are often deployed by a hunter, and in most circumstances, the hunter will deploy and retrieve the decoys each day or even several times a day if the hunter wishes to relocate to a location with more desirable activity. When the hunter prepares the decoys to take hunting, he or she often has difficulty managing the strings and the weights. Typically the decoys are carried in bags and, unless the strings are wound neatly, they often become entangled. Also, when the decoys are removed from the water, the strings and weights must be pulled from the water and wound around either the keel or the body of the decoy, which often splashes the hunter and may bring water into the boat as well. Because of the numerous decoys typically utilized, the task of winding the strings becomes wet, tedious, and time-consuming.

There are several types of reels known in the art for winding the anchor line. Some anchor line reels require either a duck decoy with a cut out underside or cutting off the keel and opening up the decoy to attach the reel device. Cutting off the keel and creating a hole in a decoy would render the decoy useless if the device were to fail or wear out. Also, removing part of the decoy may place the decoy out of balance and the decoy may not float properly in the water.

Another type of anchor line reel allows unlocking and locking of the line by inverting the decoy and placing it upright. The line locks by gravity action of internal mechanisms, which can be troublesome for hunters who deploy the decoy by throwing it into position because the line will unlock and lock as the decoy spins through the air and hits the water. Therefore, a more user friendly recoil device is desired.

In addition, the placement of the anchor line on the decoy affects the way the decoy is pulled by the water current, and if the anchor line is not located near the front of the decoy, the decoy will tend to move unnaturally in the water. A more naturally moving decoy tends to maintain the interest of the target longer. Therefore, a more natural decoy is desired.

SUMMARY OF THE INVENTION

In a preferred embodiment retrofit automatic recoil device for mounting to a decoy, the decoy includes an attachment surface, a center, and a front. A thin rectangular mounting member has a first surface, a second surface, a first end, and a second end. The first surface is operatively connected to the attachment surface of the decoy. The first end is proximate the front of the decoy and the second end is proximate the center of the decoy thereby distributing weight along the decoy and allowing the decoy to float naturally. A recoiling member has a housing, a reel, and a biasing member. The housing is operatively connected to the mounting member proximate the second end of the mounting member and encloses the reel and the biasing member. The reel is uni-directionally continually biased by the biasing member. A stopping member has a first position and a second position, and the stopping member is operatively connected to the mounting member proximate the first end of the mounting member. A line has an end portion and an intermediate portion. The end portion is operatively connected to the reel and the intermediate portion is wound around the reel and is engaged by the stopping member, wherein the line hangs from the stopping member proximate the front of the decoy. The said first position of the stopping member prevents the line from being recoiled by the reel and the second position of the stopping member allows the line to be recoiled by the reel.

In another preferred embodiment retrofit automatic recoil device for mounting to a decoy, the decoy includes an attachment surface, a center, and a front. A line has an end portion and an intermediate portion. A mounting member has a first surface, a second surface, a first end, and a second end. The first surface is operatively connected to the attachment surface of the decoy, and the first end is proximate the front of the decoy and the second end is proximate the center of the decoy thereby distributing weight along the decoy and allowing the decoy to float naturally. A recoiling means is operatively connected to the mounting member proximate the second end of the mounting member and the center of the decoy, and the end portion of the line is operatively connected to the recoiling means, wherein the recoiling means automatically retracts the line. A clamping means is operatively connected to the mounting member proximate the first end of the mounting member and the front of the decoy, and the intermediate portion of the line is engaged by the clamping means. The clamping means releasably secures the line and has a first position and a second position. The first position secures the line and the second position releases the line and allows the line to be automatically retracted by the recoiling means.

A preferred embodiment retrofit automatic recoil device for mounting to a decoy includes an attachment surface, a center, and a front. A line has an end portion and an intermediate portion. A mounting member has a first surface, a second surface, a first end, and a second end. The first surface is operatively connected to the attachment surface of the decoy, and the first end is proximate the front of the decoy and the second end is proximate the center of the decoy thereby distributing weight along the decoy and allowing the decoy to float naturally. A recoiling member is operatively connected to the mounting member proximate the second end of the mounting member and the center of the decoy, and the end portion of the line is operatively connected to the recoiling member, wherein the recoiling member retracts the line. A stopping member is operatively connected to the mounting member proximate the first end of the mounting member and the front of the decoy, and the intermediate portion of the line is engaged by the stopping member. The stopping member releasably secures the line and has a first position and a second position, wherein the first position secures the line and the second position releases the line and allows the line to be retracted by the recoiling member.

In a preferred embodiment retrofit automatic recoil device for mounting to a decoy, the decoy has an attachment surface, a center, and a front. A line has an end portion and an intermediate portion. A mounting member has a first surface, a second surface, a first end, and a second end. The first surface is operatively connected to the attachment surface of the decoy, and the first end is proximate the front of the decoy and the second end is proximate the center of the decoy thereby distributing weight along the decoy and allowing the decoy to float naturally. A recoiling member is operatively connected to the mounting member proximate the second end of the mounting member and the center of the decoy, and the end portion of the line is operatively connected to the recoiling member, wherein said recoiling member retracts the line. A stopping member is operatively connected to the mounting member proximate the first end of the mounting member and the front of the decoy. The intermediate portion of the line is engaged by the stopping member, and the stopping member releasably secures the line and has a first position and a second position. The first position secures the line and the second position releases the line and allows the line to be retracted by the recoiling member.

In a preferred embodiment method for recoiling a decoy anchor line for use with a decoy, the decoy has an attachment surface, a center, and a front. A line having an end portion and an intermediate portion is provided. A stopping member is attached to a first end of a mounting member proximate the front of the decoy, and the mounting member is operatively connected to the attachment surface of the decoy. The intermediate portion of the line is engaged by the stopping member, and the stopping member releasably secures the intermediate portion of the line. A recoiling member is attached to a second end of the mounting member proximate the center of the decoy. The end portion of the line is operatively connected to the recoiling member, and the recoiling member retracts the line when the stopping member is in an open position and the recoiling member does not retract the line when the stopping member is in a closed position. The stopping member is placed in the open position and the line is pulled from the recoiling member thereby extending the line. The stopping member is placed in the closed position thereby allowing the extended line to hang from the mounting member proximate the front of the decoy. Then, the stopping member is placed in the open position thereby allowing the extended line to be retracted by the recoiling member.

BRIEF DESCRIPTION OF THE DRAWINGS

FIG. 2 is a front view of the recoil device shown in FIG. 1;

FIG. 3 is a front view of a recoiling member of the recoil device shown in FIG. 1;

FIG. 4 is an elevational view of a stopping member in a closed position of the recoil device shown in FIG. 1;

FIG. 5 is an elevational view of the stopping member in an open position of the recoil device shown in FIG. 1; and FIG. 6 is an elevational view of the recoil device mounted to the bottom of a decoy.

DETAILED DESCRIPTION OF THE PREFERRED EMBODIMENT

Figure 1:
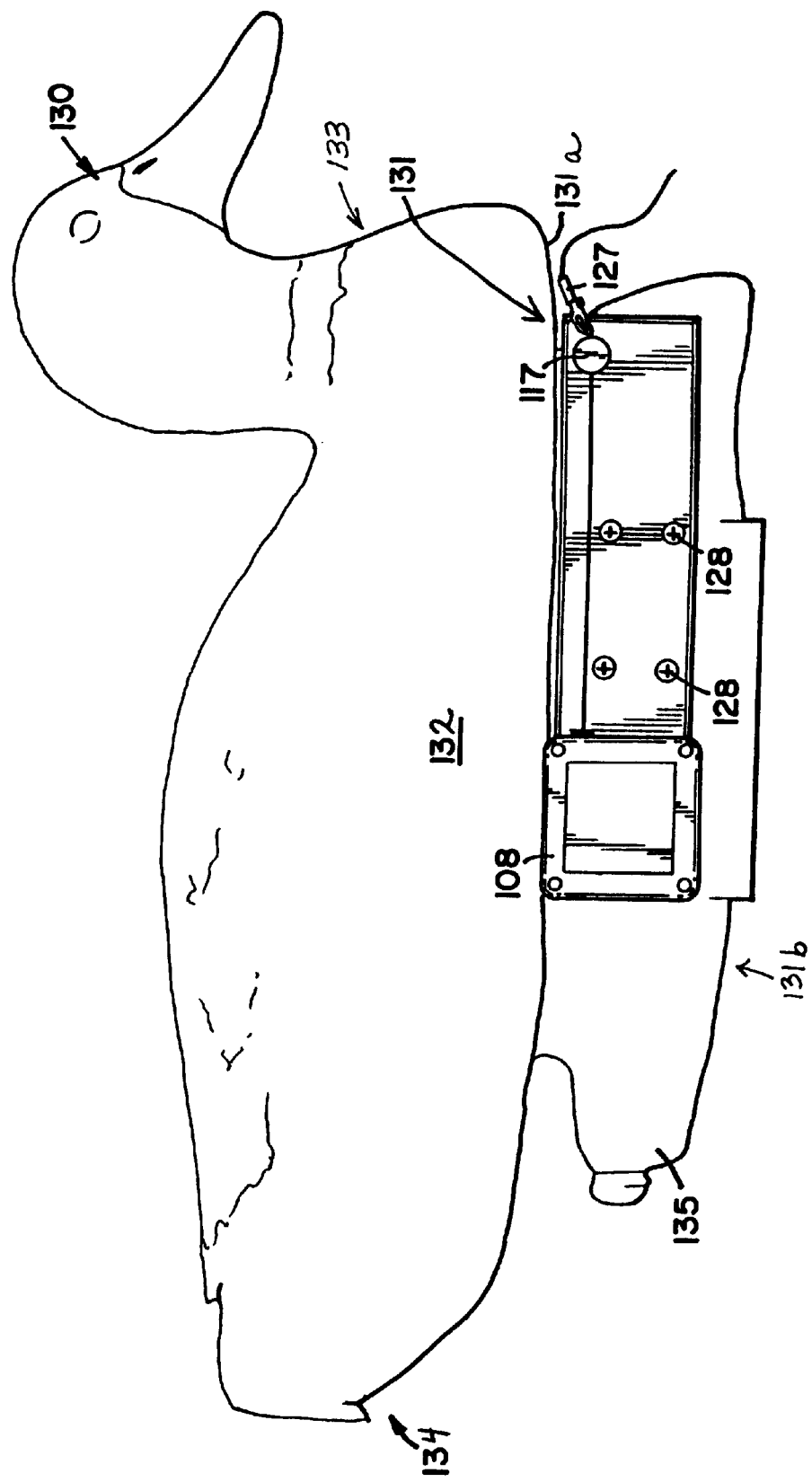
FIG. 1 is an elevational view of a recoil device mounted to a keel of a decoy constructed according to the principles of the present invention.

A preferred embodiment recoil device for use with a decoy constructed according to the principles of the present invention is designated by the numeral 100 in FIG. 2.

The preferred embodiment is a retrofit automatic recoil device 100, retrofit meaning that the recoil device 100 may be mounted to a presently owned decoy 130 without substantially altering the decoy 130 and without ruining the structural integrity of the decoy 130 if it is removed. The decoy 130 includes an attachment surface 131, which is either a bottom 131a of the decoy 130 or a keel 131b attached to the bottom 131a of the decoy. Depending upon the type of decoy used, either surface is suitable for mounting the recoil device 100. The decoy 130 also includes a center 132, a front 133, and a back 134. The front 133 is proximate the head of the decoy 130 and the back 134 is proximate the rear of the decoy 130. If the decoy 130 includes a keel 131b on the bottom 131a, the keel 131b includes a side surface 135 and a bottom surface onto which the recoil device 100 may be attached.

The recoil device 100 is simply mounted to either the keel 131b, as shown in FIG. 1, or the bottom 131a, as shown in FIG. 6, of the decoy 130 with two or more screws. Therefore, it is relatively easy to both mount and detach the recoil device 100. The recoil device 100 is generally in line with the shape of the attachment surface 131 and is tucked under the decoy 130 so that the decoy 130 is virtually unchanged by the recoil device 100 because nothing is hanging or flopping from the decoy 130 when not in use.

The preferred embodiment recoil device 100 includes a mounting member 101, which is a relatively thin, rectangular shaped plate having six sides that is approximately 2.0 to 2.5 inches wide, approximately 6.0 to 8.5 inches long, and approximately 0.125 to 0.375 inch thick. However, it is recognized that these dimensions may change to accommodate different size and style decoys. More specifically, the mounting member 101 has a first surface 102, a second surface 103, a first end 104, and a second end 105. The first surface 102 is the surface onto which an attachment surface 131 of a decoy 130 is operatively connected, and the second surface 103 is the surface onto which the other components of the recoil device 100 are operatively connected. When the mounting member 101 is attached to the attachment surface 131 of the decoy 130, the first end 104 is positioned proximate the front 133 of the decoy 130 and the second end 105 is positioned proximate the center 132 of the decoy 130.

The first surface 102 is any one of the following: a first side 102a, a second side 102b, a third side 102c, a fourth side 102d, or a fifth side 102e of the mounting member 101. The first side 102a is the back of the rectangular plate opposite the second surface 103. The second side 102b is the left edge of the plate proximate the second end 105 of the mounting member 101. The third side 102c is the top edge of the plate, and the fourth side 102d is the bottom edge of the plate. The fifth side 102e is the right edge of the plate proximate the first end 104 of the mounting member 101. The second surface 103 is the sixth side of the mounting member 101 on the front of the rectangular plate. In other words, any of the first five sides 102a–e of the mounting member 101 could be operatively connected to the attachment surface 131 of the decoy 130. However, the side 103 onto which the recoiling member 108 and the stopping member 117 are operatively connected could not be attached to the decoy 130.

In the preferred embodiment, the mounting member 101 includes screw holes 106 proximate the center portion of the mounting member 101 through which two or more screws 128 are placed to attach the first side 102a of the mounting member 101 to the attachment surface 131 of the decoy 130. Again, this is shown in FIGS. 1 and 6. Alternatively, a flange (not shown) could be added to any one of the five sides 102a–e for attachment to the decoy's attachment surface 131 rather than attaching the mounting member 101 directly to the decoy 130.

The other components of the recoil device 100 include a recoiling member 108 and a stopping member 117. The recoiling member 108 is operatively connected to the mounting member 101 on the second surface 103 proximate the second end 105, which is near the center 132 of the decoy's body. The stopping member 117 is operatively connected to the mounting member 101 on the second surface 103 proximate the first end 104, which is near the front 133 of the decoy 130. The location of the mounting member 101 on the attachment surface 131 of the decoy 130 allows the decoy 130 to float more naturally in the water because the weight of the mounting member 101 is relatively evenly distributed along the length of the decoy 130. The mounting member 101 and the stopping member 117 extend approximately 45% of the weight toward the front 133 of the decoy 130 thus distributing the load to allow the decoy 130 to float uninhibited, which is important for the natural look and function of the decoy 130.

It is recognized that the recoil device 100 may be constructed using commercially available component parts such as for the recoiling member 108 and the stopping member 117 or it may be manufactured as a single unit. In the preferred embodiment, the recoiling member 108 is a 2.5 by 2.5 square inches direct drive (automatic) spring box, as shown in FIG. 3. This component is manufactured by Sandvik Steel as Display Reel, part number DBI9510974. However, this component was modified for the preferred embodiment by replacing the existing spring with a 0.0060 by 0.375 by 80 inches Type 301 spring manufactured by Sandvik Steel as part number 1FRL010007. The replacement spring is longer and thicker than the original spring, and this modification improves the biasing mechanism of the recoiling member 108. Although the preferred embodiment utilizes a spring box, other recoiling means having a spring mechanism to recoil the line such as an open reel with a constant force spring or biasing member may be used. The preferred embodiment stopping member 117 is commercially available as part number SP109 manufactured by UMX, but again, other clamping means such as a clothes pin, a spring-loaded clamp, or a lever lock may be used.

The recoiling member 108 includes a housing 109 having a first housing member 110 and a second housing member 111, which are configured and arranged to mate with one another to form a box-like unit having an inner cavity. The first housing member 110 includes a post 113 protruding into the cavity in the center of the first housing member 110 and contacting the second housing member 111, and the second housing member 111 covers the components contained within the cavity.

The recoiling member 108 also includes a reel 114 having a hub 114*b* formed by four radially extending spokes 90° from one another on one side of the reel 114, and at the ends of the spokes is a spool portion 114*c*. The post 113 engages the hub 114*b* and allows the reel 114 to rotate about the post 113. The other side of the reel 114 does not include spokes and therefore forms a cavity between the spokes and the first housing member 110. The post 113 includes a slot 113*a* and the reel 114 has a slot 114*a* in the spool portion 114*c* proximate the end of one of the spokes. A constant force is exerted upon the reel 114 by a spring or biasing member 115 within the cavity formed by the first housing member 110 and the reel 114. The biasing member 115 is made of stainless steel and is not effected by water, sun, or temperature. The biasing member 115 uni-directionally continually biases the reel 114 about the post 113. A first end 115*a* of the biasing member 115 is inserted into slot 113*a* to engage the post 113. The biasing member 115 is then wound around the post 113 within the cavity of the reel 114. A second end 115*b* of the biasing member 115 is inserted into slot 114*a* to engage the reel 114. Therefore, the biasing member 115 exerts a constant force upon the reel 114 because the biasing member 115 wants to unwind to uni-directionally rotate the reel 114 about the post 113. The housing 109 also includes a line feed aperture 112 on the right side of the housing 109 near the upper right corner.

The reel 114 also includes the spool portion 114*c* around which an anchor line 126 is wound. The spool portion 114*c* is a cylindrical surface proximate the ends of the spokes extending from the hub 113. Flanges extend from the spool portion 114*c* to prevent the line 126 from sliding off the spool portion 114*c*. An attachment point 114*d* in the reel 114 is located 90° counterclockwise from the slot 114*a*, and a first end portion 126*a* of the line 126 is attached to the attachment point 114*d*. An intermediate portion 126*b* of the line 126 is wound around the spool portion 114*c* of the reel 114. A second end portion 126*c* of the line 126 includes a stop 127 where an anchor (not shown) is attached. The stop 127 also ensures that the entire length of the line 126 is not retracted into the recoiling member 108 because the stop 127 cannot pass through the stopping member 117.

The stopping member 117 is an external, replaceable lock device that operates with the push of a release button 121 and the line 126 cannot be released without compressing the button 121. The stopping member 117 includes a base 118 with a first opening 119 and the release button 121 with a second opening 124. The base 118 is a cylindrical member operatively connected to the second surface 103 of the mounting member 101 proximate the first end 104 of the mounting member 101 and the front 133. The first opening 119 is located proximate the center of the base 118. The button 121 is configured and arranged to fit within the base 118 and cooperates with the base 118 to act as clamping means to lock the line 126 in place. The second opening 124 is located between the top 122 and the bottom 123 of the button 121. The top 122 of button 121 provides a surface upon which force may be applied to release the locking effect of the stopping member 117. The bottom 123 provides a surface upon which force may be applied by a spring or biasing member 120 to push the button 121 upward away from the base 118 to maintain the locking effect of the stopping member 117. In other words, the release button 121 has a first position 121*a* and a second position 121*b*. The first opening 119 and the second opening 124 are not aligned when the release button 121 is in the first position 121*a*, and the first opening 119 and the second opening 124 are aligned when the release button 121 is in the second position 121*b*. FIGS. 4 and 5 show the stopping member 117 in a first position 121*a* and a second position 121*b*. The first position 121*a* locks the line 126 in place at a desired length because the openings 119 and 124 clamp down upon the line 126, and the second position 121*b* allows the line 126 to be pulled from the reel 114 or recoiled and wound onto the reel 114.

The line 126 hangs from the front 133 of the decoy 130 to allow the decoy 130 to shift in direction naturally as the direction of the wind changes. When the line 126 is recoiled, it does not interfere with or get tangled with other decoys. The line is thread through and releasably engaged by the stopping member 117, which allows the line 126 to hang from the front 133 of the decoy 130.

In operation, the release button 121 is pressed downward as in FIG. 5 to align the first opening 119 and the second opening 124. The line 126 is then pulled outward from the recoil device 100. As the line 126 is pulled, the reel 114 rotates in a clockwise direction about the post 113 causing the biasing member 115 to wind more tightly within the cavity around the post 113. The button 121 is then released thereby allowing the biasing member 120 to place the stopping member 117 in the first position 121a and the first opening 119 and the second opening 124 are no longer in alignment as shown in FIG. 4. Therefore, the line 126 is locked into position by the stopping member 117 and the biasing member 115 remains more tightly wound around the post 113. The decoy 130 is then anchored in place by the anchor at the second end portion 126c of the line 126. When it is desired to retract the line 126, the top 122 of the button 121 is pressed downward to align the first opening 119 and the second opening 124. Because the force of the biasing member 115 wants to unwind or uncoil away to become less tightly wound about the post 113, the reel 114 rotates in a counter-clockwise direction about the post 113 thereby retracting and winding the line 126 about the spool portion 114c. The line 126 is thereby automatically retracted or recoiled into the recoil device 100 with some resistance from the water and possibly some weeds. No physical winding or reeling of the line 126 is required by the operator of the recoil device 100.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A retrofit automatic recoil device for mounting to a decoy, the decoy including an attachment surface, a center, and a front, wherein the attachment surface is a surface selected from the group consisting of a bottom of the decoy and a side surface of a keel operatively connected to the decoy, comprising:
   a. a thin rectangular mounting member having a first surface, a second surface, a first end, and a second end, said first surface being operatively connected to an attachment surface of a decoy, said first end being proximate a front of the decoy and said second end being proximate a center of the decoy thereby distributing weight along the decoy and allowing the decoy to float naturally;
   b. a recoiling member having a housing, a reel, and a biasing member, said housing being operatively connected to said mounting member proximate said second end of said mounting member and enclosing said reel and said biasing member, said reel being unidirectionally continually biased by said biasing member;
   c. a stopping member having a first position and a second position, said stopping member being operatively connected to said mounting member proximate said first end of said mounting member; and
   d. a line having a first end portion, a second end portion, and an intermediate portion, said first end portion being operatively connected to said reel and said intermediate portion being wound around said reel and being engaged by said stopping member, said second end portion including a stop, wherein said line hangs from said stopping member proximate the front of the decoy, wherein said first position of said stopping member prevents said line from being recoiled by said reel and wherein said second position of said stopping member allows said line to be recoiled by said reel, said stop preventing said second end portion from passing through said stopping member thereby preventing said second end portion from being recoiled into said housing.

2. The recoil device of claim 1, wherein said recoiling member and said stopping member are operatively connected to said second surface of said mounting member.

3. The recoil device of claim 1, wherein said stopping member is a look device having a base with a first opening and a release button with a second opening, said first position being when said first opening and said second opening do not align, said second position being when said first opening and said second opening align.

4. A retrofit automatic recoil device for mounting to a decoy, the decoy including a center and a front, comprising:
   a. an attachment surface operatively connected to a decoy, the attachment surface being a surface selected from the group consisting of a bottom of the decoy and a side surface of a keel operatively connected to the bottom of the decoy;
   b. a line having a first end portion, a second end portion, and an intermediate portion, said second end portion including a stop;
   c. a mounting member having a first surface, a second surface, a first end, and a second end, said first surface being operatively connected to the attachment surface of the decoy, said first end being proximate a front of the decoy and said second end being proximate a center of the decoy thereby distributing weight along the decoy and allowing the decoy to float naturally;
   d. recoiling means being operatively connected to said mounting member proximate said second end of said mounting member and the center of the decoy, said first end portion of said line being operatively connected to said recoiling means, wherein said recoiling means automatically retracts said line; and
   e. clamping means being operatively connected to said mounting member proximate said first end of said mounting member and the front of the decoy, said intermediate portion of said line being engaged by said clamping means, said clamping means releasably securing said line and having a first position and a second position, wherein said first position secures said line and said second position releases said line and allows said line to be automatically retracted by said recoiling means, said stop preventing said second end portion from passing through said clamping means thereby preventing said second end portion from being recoiled into said recoiling means.

5. The recoil device of claim 4, wherein said recoiling means and said clamping means are operatively connected to said second surface of said mounting member.

6. The recoil device of claim 4, wherein said clamping means is a lock device having a base with a first opening and a release button with a second opening, said first position being when said first opening and said second opening do not align, said second position being when said first opening and said second opening align.

7. A retrofit automatic recoil device for mounting to a decoy, the decoy including an attachment surface, a center, and a front, wherein the attachment surface is a surface selected from the group consisting of a bottom of the decoy and a side surface of a keel operatively connected to the decoy, comprising:
   a. a line having a first end portion, a second end portion, and an intermediate portion, said second end portion including a stop;
   b. a mounting member having a first surface, a second surface, a first end, and a second end, said first surface being operatively connected to an attachment surface of a decoy, said first end being proximate a front of the decoy and said second end being proximate a center of the decoy thereby distributing weight along the decoy and allowing the decoy to float naturally;

c. a recoiling member being operatively connected to said mounting member proximate said second end of said mounting member and the center of the decoy, said first end portion of said line being operatively connected to said recoiling member, wherein said recoiling member retracts said line; and d. a stopping member being operatively connected to said mounting member proximate said first end of said mounting member and the front of the decoy, said intermediate portion of said line being engaged by said stopping member, said stopping member releasably securing said line and having a first position and a second position, wherein said first position secures said line and said second position releases said line and allows said line to be retracted by said recoiling member, said stop preventing said second end portion front passing through said stopping member thereby preventing said second end portion from being recoiled into said recoiling member.

8. The recoil device of claim 7, wherein said recoiling member and said stopping member are operatively connected to said second surface of said mounting member.

9. The recoil device of claim 7, wherein said stopping member is a lock device having a base with a first opening and a release button with a second opening, said first position being when said first opening and said second opening do not align, said second position being when said first opening and said second opening align.

10. A retrofit automatic recoil device for mounting to a decoy, comprising:

a. a decoy having an attachment surface, a center, and a front, wherein said attachment surface is a surface selected from the group consisting of a bottom of said decoy and a side surface of a keel operatively connected to said decoy;

b. a line having first end portion, a second end portion, and an intermediate portion, said second end portion including a stop;

c. a mounting member having a first surface, a second surface, a first end, and a second end, said first surface being operatively connected to said attachment surface of said decoy, said first end being proximate said front of said decoy and said second end being proximate said center of said decoy thereby distributing weight along said decoy and allowing said decoy to float naturally;

d. a recoiling member being operatively connected to said mounting member proximate said second end of said mounting member and said center of said decoy, said first end portion of said line being operatively connected to said recoiling member, wherein said recoiling member retracts said line; and e. a stopping member being operatively connected to said mourning member proximate said first end of said mounting member and said front of said decoy, said intermediate portion of said line being engaged by said stopping member, said stopping member releasably securing said line and having a first position and a second position, wherein said first position secures said line and said second position releases said line and allows said line to be refracted by said recoiling member, said stop preventing said second end portion from passing through said stopping member thereby preventing said second end portion from being retracted into said recoiling member.

11. The recoil device of claim 10, wherein said recoiling member and said stopping member are operatively connected to said second surface of said mounting member.

12. The recoil device of claim 10, wherein said stopping member is a lock device having a base with a first opening and a release button with a second opening, said first position being when said first opening and said second opening do not align, said second position being when said first opening and said second opening align.

13. A method for recoiling a decoy anchor line for use with a decoy, the decoy having an attachment surface, a center, and a front, wherein the attachment surface is a surface selected from the group consisting of a bottom of the decoy and a side surface of a keel operatively connected to the decoy, comprising:

a. providing a line having first end portion, a second end portion, and an intermediate portion said second end portion including a stop;

b. attaching a stopping member to a first end of a mounting member, said mounting member being operatively connected to an attachment surface of a decoy and said first end being proximate a front of the decoy, said intermediate portion of said line being engaged by said stopping member, wherein said stopping member releasably secures said intermediate portion of said line;

c. attaching a recoiling member to a second end of said mounting member proximate a center of the decoy, said first end portion of said line being operatively connected to said recoiling member, wherein said recoiling member retracts said line when said stopping member is in an open position and wherein said recoiling member does not retract said line when said stopping member is in a closed position;

d. placing said stopping member in said open position and pulling said line from said recoiling member thereby extending said line;

e. placing said stopping member in said closed position thereby allowing said extended line to hang from said mounting member proximate the front of the decoy; and f. placing said stopping member in said open position thereby allowing said extended line to be retracted by said recoiling member, said stop preventing said second end portion from passing through said stopping member thereby preventing said second end portion from being recoiled into said recoiling member.

14. The method of claim 13, further comprising throwing the decoy into position when said stopping member is in said closed position in step (e).

15. The method of claim 13, said stopping member being a lock device having a base with a first opening and a release button with a second opening, said closed position being when said first opening and said second opening do not align, said open position being when said first opening and said second opening align.

* * * * *